US 9,458,632 B2

(12) United States Patent
Morris et al.

(10) Patent No.: US 9,458,632 B2
(45) Date of Patent: Oct. 4, 2016

(54) COMPOSITE MATERIALS AND APPLICATIONS THEREOF AND METHODS OF MAKING COMPOSITE MATERIALS

(71) Applicant: PPG Industries Ohio, Inc., Cleveland, OH (US)

(72) Inventors: Steven John Morris, Shelby, NC (US); James Carl Peters, Shelby, NC (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 13/803,344

(22) Filed: Mar. 14, 2013

(65) Prior Publication Data
US 2014/0109510 A1  Apr. 24, 2014

Related U.S. Application Data

(60) Provisional application No. 61/715,550, filed on Oct. 18, 2012.

(51) Int. Cl.
E04C 5/07 (2006.01)
B32B 18/00 (2006.01)
(Continued)

(52) U.S. Cl.
CPC .............. E04C 5/073 (2013.01); B32B 18/00 (2013.01); C04B 14/42 (2013.01); C04B 28/34 (2013.01);
(Continued)

(58) Field of Classification Search
CPC .......... E04C 3/00; E04C 3/04; B32B 11/02; B32B 11/04
See application file for complete search history.

(56) References Cited

U.S. PATENT DOCUMENTS 4,116,886 A   9/1978 Cella
4,159,361 A   6/1979 Schupack
(Continued)

FOREIGN PATENT DOCUMENTS

EP  0 233 700   8/1987
EP  0 287 918   10/1988
(Continued)

OTHER PUBLICATIONS

"filament"—The Free Dictionary (Apr. 8, 2015); <http://www.thefreedictionary.com/filament>.*
(Continued)

Primary Examiner — David Sample
Assistant Examiner — Donald M Flores, Jr.
(74) Attorney, Agent, or Firm — Kilpatrick Townsend & Stockton LLP

(57) ABSTRACT

Various embodiments of the present invention provide composite materials and methods of making the same. In some embodiments, the composite materials comprise high temperature resistant composite materials and methods of making high temperature resistant composite materials. In some embodiments, high temperature resistant composite materials of the present invention can be fabricated into landing pads, components used in landing pads to provide a structure to support the take-off and landing of aircraft, roadways or similar travel paths for heavy equipment, and/or components used in roadways or similar travel paths for heavy equipment. In one embodiment, a composite material comprises an inorganic ceramic matrix having a top surface in facing opposition to a bottom surface and at least one side surface between the top surface and the bottom surface, a first open weave fabric comprising a plurality of fibers disposed in the matrix proximate the bottom surface of the matrix, and at least one additional open weave fabric comprising a plurality of fibers disposed in the matrix between the first open weave fabric and the top surface of the matrix, wherein the at least one additional open weave fabric is positioned closer to the bottom surface than the top surface of the matrix.

26 Claims, 9 Drawing Sheets

(51) Int. Cl.

| | | |
|---|---|---|
| *C04B 35/447* | (2006.01) | |
| *C04B 35/628* | (2006.01) | |
| *C04B 35/82* | (2006.01) | |
| *C04B 28/34* | (2006.01) | |
| *C04B 14/42* | (2006.01) | |
| *C04B 111/00* | (2006.01) | |

(52) U.S. Cl.
CPC ....... *C04B 35/447* (2013.01); *C04B 35/62844* (2013.01); *C04B 35/82* (2013.01); *C04B 2111/0075* (2013.01); *C04B 2111/00612* (2013.01); *C04B 2235/5256* (2013.01); *C04B 2237/34* (2013.01); *C04B 2237/36* (2013.01); *C04B 2237/70* (2013.01); *C04B 2237/704* (2013.01); *Y10T 442/133* (2015.04); *Y10T 442/14* (2015.04); *Y10T 442/153* (2015.04); *Y10T 442/171* (2015.04)

(56) References Cited

U.S. PATENT DOCUMENTS

| | | | | |
|---|---|---|---|---|
| 4,569,178 | A | * | 2/1986 | Kovacs ................. 52/745.13 |
| 4,578,301 | A | * | 3/1986 | Currie et al. .................. 428/109 |
| 4,617,219 | A | * | 10/1986 | Schupack .................... 428/221 |
| 4,680,203 | A | | 7/1987 | Maki et al. |
| 4,739,690 | A | | 4/1988 | Moskowitz |
| 4,813,334 | A | | 3/1989 | Bloks et al. |
| 5,002,610 | A | * | 3/1991 | Sherif et al. ................. 106/691 |
| 5,153,152 | A | | 10/1992 | Dawes et al. |
| 5,167,876 | A | | 12/1992 | Lem et al. |
| 5,221,807 | A | | 6/1993 | Vives |
| 5,836,715 | A | * | 11/1998 | Hendrix et al. .............. 404/134 |
| 6,135,006 | A | | 10/2000 | Strasser et al. |
| 6,176,920 | B1 | | 1/2001 | Murphy et al. |
| 7,300,893 | B2 | | 11/2007 | Barsoum et al. |
| 7,354,876 | B2 | | 4/2008 | Porter et al. |
| 7,615,178 | B2 | | 11/2009 | Porter et al. |
| 7,615,504 | B2 | | 11/2009 | Porter et al. |
| 8,273,172 | B2 | | 9/2012 | Selph et al. |
| 2003/0110932 | A1 | | 6/2003 | Mohr et al. |
| 2005/0009428 | A1 | | 1/2005 | Porter et al. |
| 2006/0014457 | A1 | | 1/2006 | Newton et al. |
| 2007/0068377 | A1 | | 3/2007 | Qiao et al. |
| 2007/0111621 | A1 | | 5/2007 | Barsoum et al. |
| 2007/0116939 | A1 | | 5/2007 | Benitsch et al. |
| 2007/0166514 | A1 | | 7/2007 | Friedman et al. |
| 2008/0012169 | A1 | | 1/2008 | Soloman et al. |
| 2008/0223203 | A1 | | 9/2008 | Ravid et al. |
| 2008/0223204 | A1 | | 9/2008 | Genihovich et al. |
| 2008/0264244 | A1 | | 10/2008 | Ravid et al. |
| 2008/0307553 | A1 | | 12/2008 | Jbeili et al. |
| 2010/0119777 | A1 | | 5/2010 | Merrill et al. |
| 2011/0027560 | A1 | * | 2/2011 | Peters et al. ................ 428/215 |

FOREIGN PATENT DOCUMENTS

| | | |
|---|---|---|
| EP | 0 500 250 | 8/1992 |
| EP | 1 538 417 | 6/2005 |
| GB | 2 336 595 | 10/1999 |
| GB | 2 444 389 | 6/2008 |
| JP | 5 161 238 | 6/1993 |
| WO | WO 2005/040711 | 5/2005 |
| WO | WO 2005/079207 | 9/2005 |
| WO | WO 2005/098343 | 10/2005 |
| WO | WO 2007/005043 | 1/2007 |
| WO | WO 2007/019959 | 2/2007 |
| WO | WO 2007/140626 | 12/2007 |
| WO | WO 2008/077605 | 7/2008 |
| WO | WO 2008/105889 | 9/2008 |
| WO | WO 2008/143662 | 11/2008 |
| WO | WO 2008/144892 | 12/2008 |
| WO | WO 2008/153613 | 12/2008 |
| WO | WO 2012/118516 | 9/2012 |

OTHER PUBLICATIONS

[NPL #1] INEOS Olefins & Polymers USA, "Typical Engineering Properties of Polypropylene"; (Apr. 2014), <http://www.ineos.com/Global/Olefins%20and%20Polymers%20USA/Products/Technical%20information/INEOS%20Engineering%20Properties%20of%20PP.pdf >.*

[NPL #2] Babrauskas, V. "Ignition of Wood a Review of the State of the Art". Interflam 2001, Interscience Communications Ltd. London (2001), pp. 71-88. <http://marioloureiro.net/ciencia/ignicao_vegt/wood_ign.pdf>.*

[NPL #3] American Society for Testing and Materials, "ASTM E119 standard Test Method". ASTM Interntaional.*

Patent Cooperation Treaty, International Search Report and Written Opinion, International Application No. PCT/US2013/065566, mailed Feb. 14, 2014.

Patent Cooperation Treaty, International Search Report, International Application PCT/US2010/033552, mailed Feb. 23, 2011.

O'Neil III, E. et al., Development of Very-High-Strength and High-Performance Concrete Materials for Improvement of Barriers against Blast and Projectile Penetration, Selected Topics in Electronics and Systems, 2006, 42(Transformational Science and Technology for the Current and Future Force), pp. 203-210.

Zhang, J. et al., "Performance of Hybrid-Fiber ECC Blast/Shelter Panels Subjected to Drop Weight Impact," Journal of Material in Civil Engineering, 2007, 19(10), pp. 855-863.

ASM Handbook, vol. 21: Composites, D.B. Miracle and S.L. Donaldson, eds., pp. 27-34 and 59-68, 2001.

Kosmatka, S., Chapter 5: Properties and Performance of Normal-Strength and High-Strength Concrete, Concrete Construction Engineering Handbook, Second Edition, pp. 5-1 to 5-46, 2008.

Kosmatka, S., Cement, Kirk-Othmer Encyclopedia of Chemical Technology, 2003, pp. 467-505.

Concrete Engineering, U.S. Army Engineer Center and School, Subcourse EN5466 Edition A, 1992, pp. 1-1 to 4-38.

Iron and Steel Slag Statistics and Information, USGS Minerals Information, web page at http://minerals.usgu.gov/minerals/pubs/commodity/iron_&_steel_slag/ as available via the internet and retrieved Sep. 19, 2012.

Patent Cooperation Treaty, Invitation to Pay Additional Fees and, Where Applicable, Protest Fees, Application No. PCT/US2013/065566, mailed Jan. 23, 2014.

* cited by examiner

Section A-A

Section B-B

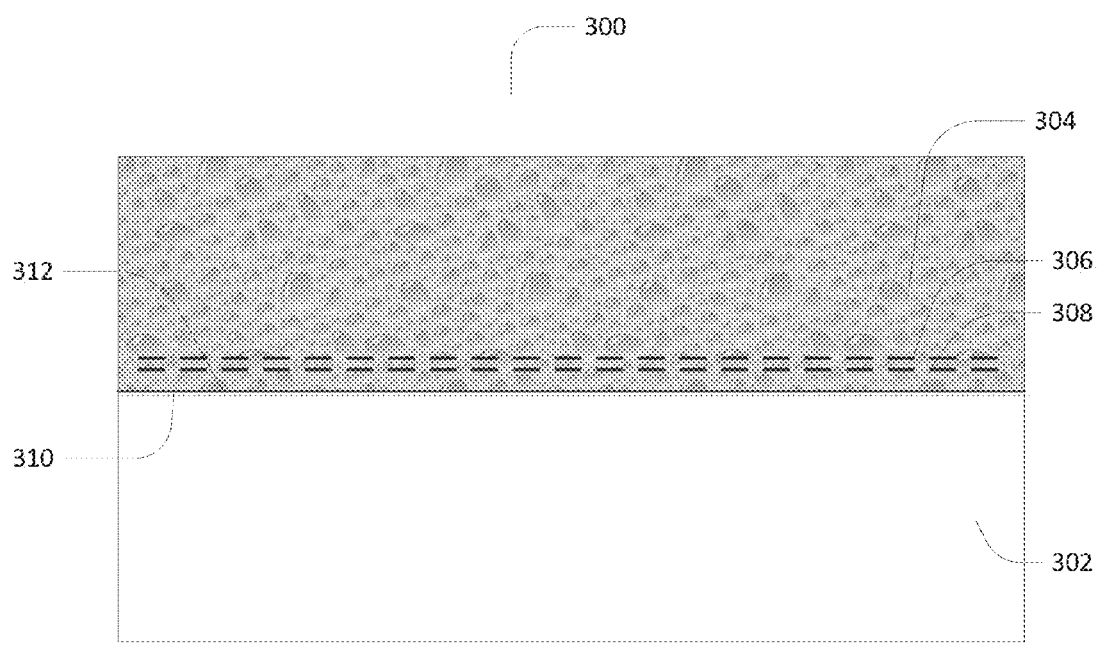

COMPOSITE MATERIALS AND APPLICATIONS THEREOF AND METHODS OF MAKING COMPOSITE MATERIALS

CROSS-REFERENCE TO RELATED APPLICATION

This application claims priority to U.S. Provisional Patent Application Ser. No. 61/715,550, filed on Oct. 18, 2012, which is hereby incorporated by reference as though fully set forth herein.

FIELD OF THE INVENTION

The present invention relates to composite materials and, in particular, to composite materials for potential use in high thermal applications.

BACKGROUND OF THE INVENTION

A variety of aircraft take-off from and land on a variety of surfaces including, for example, concrete landing pads and ship decks (e.g., the deck of an aircraft carrier). Conventional concrete landing pads and traditional coatings used for the top-decks of ships may not be durable enough to withstand the high temperatures generated by the exhaust gases of modern aircraft, such as vertical take-off and landing ("VTOL") aircraft. For example, concrete pads may begin to spall and break apart when exposed to direct heat from the jet engines of these aircraft. In addition, some surfaces such as runways and roadways need to withstand repeated travel and usage by heavy equipment including, for example, trucks, aircraft, helicopters, etc.

SUMMARY

Various embodiments of the present invention provide composite materials and methods of making the same. In some embodiments, the composite materials comprise high temperature resistant composite materials and methods of making high temperature resistant composite materials. In some embodiments, high temperature resistant composite materials of the present invention can be fabricated into landing pads or components used in landing pads to provide a structure to support the take-off and landing of aircraft and/or repeated usage by heavy equipment. In some embodiments, composite materials of the present invention can provide adequate strength characteristics in addition to high temperature resistance. In some embodiments, composite materials of the present invention can provide impact resistance and/or friction for a landing pad or components used in landing pads for conventional and/or vertical take-off aircraft, as well as for usage on roadways for heavy equipment.

In some embodiments, a composite material can comprise an inorganic ceramic matrix having a first surface in facing opposition to a second surface and at least one woven fiber reinforcement disposed in the matrix between the first surface and the second surface. The woven fiber reinforcement can be constructed from, in various embodiments, glass, Kevlar, carbon, steel, and/or polyester fibers. The woven fiber reinforcement, in some embodiments, can be a woven glass fiber reinforcement. In some embodiments, a composite material can comprise an inorganic ceramic matrix having a first surface in facing opposition to a second surface and at least one woven glass fiber reinforcement disposed in the matrix between the first surface and the second surface. The at least one woven glass fiber reinforcement, in some embodiments, may be a fabric having an open weave pattern such that the inorganic ceramic matrix may contact itself through the openings in the weave pattern. The at least one woven glass fiber reinforcement, in some embodiments, can be a leno-grid woven glass fiber fabric. In other embodiments, the at least one woven glass fiber reinforcement can be a half leno-grid woven glass fiber fabric.

In some embodiments, a composite material comprises an inorganic ceramic matrix having a top surface in facing opposition to a bottom surface and at least one side surface between the top surface and the bottom surface, a first open weave fabric comprising a plurality of fibers disposed in the matrix proximate the bottom surface of the matrix, and at least one additional open weave fabric comprising a plurality of fibers disposed in the matrix between the first open weave fabric and the top surface of the matrix, wherein the at least one additional open weave fabric is positioned closer to the bottom surface than the top surface. The open weave fabrics can be constructed from, in various embodiments, glass, Kevlar, carbon, steel, and/or polyester fibers. The open weave fabrics, in some embodiments, can be a open weave fiber glass fabrics.

The inorganic ceramic matrix can comprise a phosphate ceramic matrix in some embodiments. The inorganic ceramic matrix can also comprise a plurality of stones in some embodiments. In some embodiments comprising a plurality of stones, the plurality of stones can comprise from about 50% to about 65% by weigh of the inorganic ceramic matrix. The inorganic ceramic matrix can be formed using disodium tetraborate and water in some embodiments.

In some embodiments, multiple open weave fabrics can be disposed in the inorganic ceramic matrix. The composite material, in some embodiments can comprise a first open weave fabric disposed in the matrix proximate the bottom surface of the matrix, and can further comprise a first region above the first open weave fabric comprising at least two open weave fabrics adjacent to one another, wherein the first region is closer to the bottom surface of the matrix than to the top surface. In some further embodiments, the composite material can comprise a second region above the first region having at least two open weave fabrics adjacent to one another, wherein the second region is closer to the bottom surface of the matrix than to the top surface. In some embodiments comprising a plurality of open weave fabrics in the matrix, each of the open weave fabrics can be positioned closer to the bottom surface of the matrix than to the top surface.

In some embodiments, a composite material can further comprise a plurality of dowel rods extending from at least one side surface of the inorganic ceramic matrix. In some embodiments wherein the composite material comprises a plurality of dowel rods, the plurality of dowel rods can be positioned on at least one side surface at least four inches from the bottom surface of the composite material. The plurality of dowel rods can be positioned, in some embodiments, such that at least six inches of each dowel rod extends into the composite material and at least six inches of the dowel rod extends out of the composite material. In some embodiments wherein the inorganic ceramic matrix comprises four side surfaces, a first group of dowel rods can extend from a first side surface, and a second group of dowel rods can extend from a second side surface. Each dowel rod can be substantially perpendicular to the side from which it extends in some embodiments. The dowel rods can be spaced apart at least 9 inches in some embodiments. In some embodiments comprising a plurality of dowel rods, one or more reinforcing bars can be positioned above a first group of dowel rods in the inorganic ceramic matrix and oriented substantially perpendicular to the first group of dowel rods. The reinforcing bars can be connected to the dowel rods in such embodiments where one or more reinforcing bars are positioned above a group of dowel rods.

In some embodiments, a composite material can further comprise a plurality of reinforcing bars arranged in a grid pattern disposed in the matrix and proximate the bottom surface of the matrix.

Composite materials according to some embodiments can be in the form of a panel, a landing pad, a landing pad component, or other configurations.

In some embodiments, the composite material can be precast to form a panel. For example, the composite material can first be precast into a panel, and then the panel can be placed in position to form a portion of a landing pad. The panel, for example, can be positioned on a layer of concrete at an existing landing pad location. In some embodiments, the panel can replace a portion of a landing pad at that location. A plurality of panels, in some embodiments, can be positioned on a concrete base layer to form a landing pad. In some embodiments where the composite material is precast into a panel, one or more reinforcing bars (e.g., steel rebar) can be positioned in the panel to assist with transportation, placement, and/or positioning of the panel.

In some embodiments, the composite material can be cast into a form comprising concrete to provide a composite material that comprises an inorganic ceramic matrix having a first surface in facing opposition to a second surface, at least one woven glass fiber reinforcement disposed in the matrix between the first surface and the second surface, and a concrete layer wherein a surface of the concrete layer is proximate the second surface of the inorganic ceramic matrix. In some embodiments, the composite material can be cast to form panels of smaller dimensions (e.g., tiles).

A composite material, according to some embodiments, comprises an inorganic ceramic matrix having a top surface in facing opposition to a bottom surface, at least one open weave fabric comprising a plurality of fibers disposed in the matrix between the top surface and the bottom surface, and a concrete layer wherein a surface of the concrete layer is proximate the bottom surface of the inorganic ceramic matrix. In some embodiments, a first open weave fabric can be disposed in the matrix proximate the bottom surface of the matrix. The composite material, in some embodiments, can comprise two open weave fabrics disposed in the matrix adjacent to each other and proximate the bottom surface of the matrix.

Some embodiments of the present invention also relate to methods of forming composite materials. In some embodiments, a method comprises providing a casting form comprising four sidewalls, positioning a first open weave fabric in the casting form, preparing an inorganic ceramic matrix comprising a phosphate ceramic matrix, a plurality of stones, and water, pouring a first amount of the inorganic ceramic matrix into the casting form to cover the first open weave fabric, positioning at least one additional open weave fabric on the first amount of the inorganic ceramic matrix, pouring a second amount of the inorganic ceramic matrix into the casting form, and allowing the inorganic ceramic matrix to cure to form the composite material. Such methods, in some embodiments, can further comprise roughening a top surface of the second amount of the inorganic ceramic matrix. In some embodiments, the inorganic ceramic matrix can further comprise disodium tetraborate.

In some embodiments, methods of forming composite materials can further comprise positioning a first group of dowel rods in a first sidewall of the casting form wherein a portion of each dowel rod extends into the casting form. A second group of dowel rods, in some embodiments, can be positioned in a second sidewall of the casting form wherein a portion of each dowel rod extends into the casting form. In some further embodiments, two reinforcing bars can be positioned on each group of dowel rods within the casting form. In some embodiments where reinforcing bars are positioned on dowel rods, the reinforcing bars can be connected to the second group of dowel rods. In some embodiments, where dowel rods are positioned in at least one sidewall of the casting form, each of the open weave fabrics can be positioned below the dowel rods in the casting form.

In some further embodiments, positioning at least one additional open weave fabric on the first amount of the inorganic ceramic matrix can comprise positioning two additional open weave fabrics on the first amount of the inorganic ceramic matrix. In some embodiments, one or more open weave fabrics can be positioned on the second amount of the inorganic ceramic matrix. For example, two open weave fabrics can be positioned on the second amount of the inorganic ceramic matrix in some embodiments. A third amount of the inorganic ceramic matrix can be poured into the casting form in some embodiments where one or more open weave fabrics are positioned on the second amount of the inorganic ceramic matrix.

Some embodiments of methods of forming composite materials can further comprise providing a plurality of reinforcing bars arranged in a grid pattern proximate a bottom region of the matrix. The grid of reinforcing bars can be positioned beneath the first open weave fabric in some embodiments.

Methods of forming a composite material, in other embodiments, comprise providing a casting form comprising four sidewalls, positioning a first group of dowel rods in a first sidewall of the casting form wherein a portion of each dowel rod extends into the casting form, positioning two reinforcing bars on top of the first group of dowel rods within the casting form, positioning a first open weave fabric in the casting form beneath the dowel rods, preparing an inorganic ceramic matrix comprising a phosphate ceramic matrix, a plurality of stones, and water, pouring a first amount of the inorganic ceramic matrix into the casting form to cover the first open weave fabric, positioning at least one additional open weave fabric on the first amount of the inorganic ceramic matrix, pouring a second amount of the inorganic ceramic matrix into the casting form, and allowing the inorganic ceramic matrix to cure to form the composite material. Each of the open weave fabrics can be positioned in the casting form beneath the dowel rods in some embodiments. In some embodiments, the inorganic ceramic matrix can further comprise disodium tetraborate.

Some embodiments of methods of forming a composite material can comprise providing a concrete layer comprising a top surface, a bottom surface, and at least one side surface, providing a casting form, preparing an inorganic ceramic matrix comprising a phosphate ceramic matrix, a plurality of stones, and water, pouring a first amount of the inorganic ceramic matrix into the casting form, positioning at least one open weave fabric on top of the first amount of the inorganic ceramic matrix, pouring a second amount of the inorganic ceramic matrix into the casting form, and allowing the inorganic ceramic matrix to cure to form the composite panel. Such methods can further comprise providing the concrete layer using the casting form. In such embodiments, the first amount of the inorganic ceramic matrix can be poured on the top surface of the concrete layer in the casting form. In other embodiments, the concrete layer can be positioned in, on or otherwise in contact with the ground, and the inorganic ceramic matrix with the open weave fabric(s) can be formed on top of the existing concrete layer. In some embodiments, when the concrete layer is in contact with the ground, the casting form can be positioned on the top surface of the concrete layer prior to pouring the inorganic ceramic matrix. In some embodiments, the inorganic ceramic matrix can further comprise disodium tetraborate. In some embodiments, methods of the present invention can further comprise roughening a top surface of the second amount of the inorganic ceramic matrix. In some embodiments, positioning at least one open weave fabric on top of the first amount of the inorganic ceramic matrix comprises positioning two open weave fabrics on top of the first amount of the inorganic ceramic matrix. In some embodiments, methods of the present invention further comprise etching the top surface of the concrete layer with an acid.

These and other embodiments of the present invention are described in greater detail in the Detailed Description that follows.

BRIEF DESCRIPTION OF THE DRAWINGS

FIG. 9 illustrates a cross-sectional view of a composite material according to one embodiment of the present invention. The sizes of the layers, the sizes of the components, and the distances between the layers shown in FIG. 9 are for illustrative purposes.

DETAILED DESCRIPTION

Figure 1:
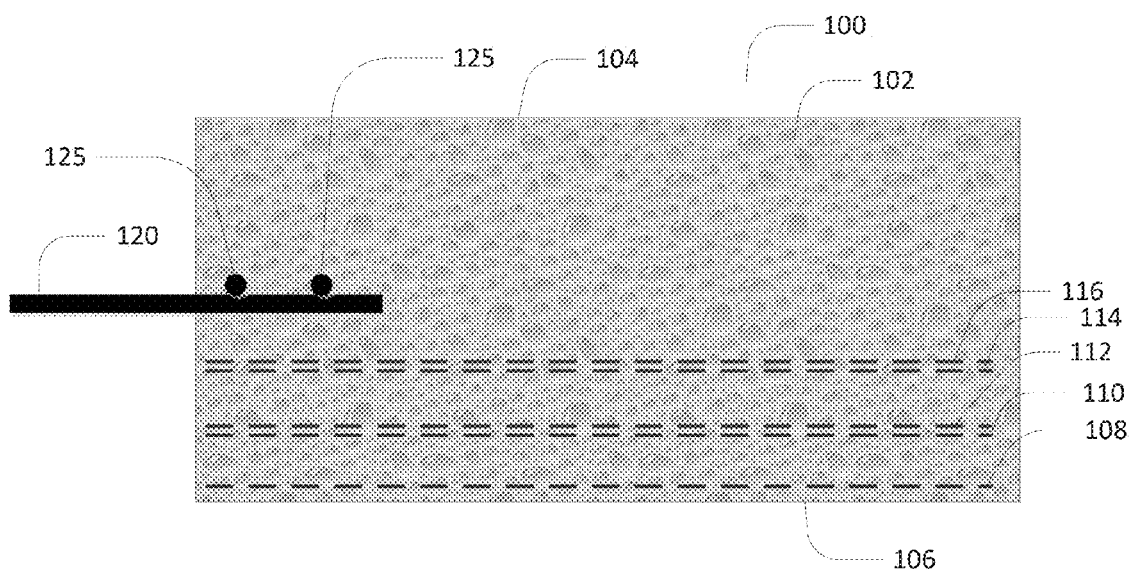
FIG. 1 illustrates a cross-sectional view of a composite material according to one embodiment of the present invention. The sizes of the layers, the sizes of the components, and the distances between the layers shown in FIG. 1 are for illustrative purposes.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Various embodiments of the present invention provide composite materials and methods of making the same. In some embodiments, the composite materials comprise high temperature resistant composite materials and methods of making high temperature resistant composite materials. In some embodiments, high temperature resistant composite materials of the present invention can be fabricated into landing pads, components used in landing pads to provide a structure to support the take-off and landing of aircraft, roadways or similar travel paths for heavy equipment, and/or components used in roadways or similar travel paths for heavy equipment. As used herein, the term "landing pads" should be understood to encompass helicopter pads, runways, aircraft carrier runways or flight decks, and other surfaces upon which aircraft can take-off, land, or travel upon. In some embodiments, composite materials of the present invention can provide adequate strength characteristics in addition to high temperature resistance. In some embodiments, composite materials of the present invention can provide impact resistance and/or friction for a landing pad or components used in landing pads for conventional and/or vertical take-off aircraft.

In some embodiments, a composite material can comprise an inorganic ceramic matrix having a first surface in facing opposition to a second surface and at least one woven fiber reinforcement disposed in the matrix between the first surface and the second surface. The woven fiber reinforcement can be constructed from, in various embodiments, glass, Kevlar, carbon, steel, and/or polyester fibers. The at least one woven fiber reinforcement, in some embodiments, may be a fabric having an open weave pattern such that the inorganic ceramic matrix may contact itself through the openings in the weave pattern.

In some embodiments, a composite material can comprise an inorganic ceramic matrix having a first surface in facing opposition to a second surface and at least one woven glass fiber reinforcement disposed in the matrix between the first surface and the second surface. The at least one woven glass fiber reinforcement, in some embodiments, may be a fabric having an open weave pattern such that the inorganic ceramic matrix may contact itself through the openings in the weave pattern. The at least one woven glass fiber reinforcement, in some embodiments, can be a leno-grid woven glass fiber fabric. In other embodiments, the at least one woven glass fiber reinforcement can be a half leno-grid woven glass fiber fabric.

In some embodiments, the composite material can be precast to form a panel. For example, the composite material can first be precast into a panel, and then the panel can be placed in position to form a portion of a landing pad. The panel, for example, can be positioned on a layer of concrete at an existing landing pad location. In some embodiments, the panel can replace a portion of a landing pad at that location. A plurality of panels, in some embodiments, can be positioned on a concrete base layer to form a landing pad. In some embodiments where the composite material is precast into a panel, one or more dowel rods and/or reinforcing bars (e.g., steel rebar) can be positioned in the panel to assist with transportation, placement, and/or positioning of the panel. Additional details about various embodiments of precast panels are provided below.

In some embodiments, the composite material can be cast into a form comprising concrete to provide a composite material that comprises an inorganic ceramic matrix having a first surface in facing opposition to a second surface, at least one woven glass fiber reinforcement disposed in the matrix between the first surface and the second surface, and a concrete layer wherein a surface of the concrete layer is proximate the second surface of the inorganic ceramic matrix. In some embodiments, the composite material can be cast to form panels of smaller dimensions (e.g., tiles). In some embodiments where the composite material is cast onto concrete in a form, the roughness of the surface of the concrete can be increased prior to casting the composite material in the form in order to improve adhesion between the composite material and the concrete. For example, in some embodiments, the surface of the concrete can be etched with an acid (e.g., phosphoric acid, muriatic acid, etc.) to roughen the surface.

In some embodiments, one surface of the composite material can be roughened to provide friction. Increased friction can be important, for example, in some embodiments where the composite materials is to be used in a landing pad to support the take-off and landing of aircraft. The surface of the composite material can be roughened, in some embodiments, during formation of the composite material. For example, in embodiments where the composite material is formed by casting into a form, a roughened surface can be formed by placing a woven glass fiber fabric on the top surface of the inorganic ceramic matrix and removing the fabric prior to hardening of the inorganic ceramic matrix. The woven glass fiber fabric can have an open weave pattern (e.g., a half leno-grid woven glass fiber fabric or a leno-grid woven glass fiber fabric). In embodiments where a woven glass fiber fabric is used to roughen the surface of a composite material, the composite material can still comprise a woven glass fiber fabric disposed in the inorganic ceramic matrix disposed between the top surface and a second surface.

In some embodiments, one surface of the composite material can be roughened in other ways. For example, in one embodiment, rather than using an open weave glass fiber fabric, a roughened surface can be formed by placing a sheet of thin, high density expanded cell material on the top surface of the inorganic ceramic matrix and removing the sheet prior to hardening of the inorganic ceramic matrix. In another embodiment, sand can be spread thinly on the top surface of the inorganic ceramic matrix. After hardening of the inorganic ceramic matrix, the excess sand can be swept off, while some of the sand remains embedded in the surface of the inorganic ceramic matrix and provides roughness.

In some embodiments, the composite material can be resistant to heat. In some embodiments, the composite material can be evaluated for heat resistance using ASTM E119. In some embodiments, a two inch thick sample of the composite material can undergo testing pursuant to ASTM E119 for 90 minutes before reaching the target temperature (220° F.) on the rear surface.

In some embodiments, a composite material of the present invention comprises an inorganic ceramic matrix having a top surface in facing opposition to a bottom surface and a plurality of woven glass fiber reinforcements disposed in the matrix between the top surface and the bottom surface. In some embodiments, a composite material comprises a first woven glass fiber fabric proximate the bottom surface of the inorganic ceramic matrix and at least one additional woven glass fiber fabric disposed between the first woven glass fiber fabric and the top surface. In some further embodiments, a plurality of woven glass fiber fabrics are disposed between the first woven glass fiber fabric and the top surface. In some embodiments, a majority of the woven glass fiber fabrics are positioned closer to the bottom surface than the top surface. All of the woven glass fiber fabrics in the composite material are positioned closer to the bottom surface than the top surface in some embodiments.

In some embodiments wherein a composite material comprises a first woven glass fiber fabric proximate the bottom surface, the composite material can further comprise a first region above the bottom surface having at least two woven glass fiber fabrics adjacent to one another, wherein the first region is closer to the bottom surface than the top surface. A composite material, in some further embodiments, can further comprise a second region above the first region having at least two woven glass fiber fabrics adjacent to one another, wherein the second region is closer to the bottom surface than the top surface.

In some embodiments where the composite material is in the form of a precast form, the precast form can comprise a plurality of dowel rods. The dowel rods can, for example, assist with placement of the precast composite material. The dowel rods can be positioned within the composite material so as to assist with placement of the precast form in a desired location. In some embodiments, the dowel rods can be positioned at least four inches from the bottom surface of the composite material. In some embodiments, a majority of the dowel rods can be positioned such that at least six inches of the dowel rod extends into the composite material and at least six inches of the dowel rod extends out of the composite material. A majority of the dowel rods, in some embodiments, can be positioned such that at least nine inches of the dowel rod extends into the composite material and at least nine inches of the dowel rod extends out of the composite material. The dowel rods can be arranged along one or more sides of the composite material. The dowel rods can be arranged substantially perpendicular to the side from which they protrude in some embodiments. In embodiments with multiple dowel rods arranged along one or more sides of the composite material, the dowel rods can be spaced at least 9 inches apart in some embodiments. The dowel rods can be spaced at least 12 inches apart in some embodiments.

One or more reinforcing bars can be positioned above a plurality of dowel rods in some embodiments. The one or more reinforcing bars can be arranged substantially perpendicular to the dowel rods in some embodiments. In addition to being substantially perpendicular to the dowel rods, in some embodiments, the reinforcing bars can be arranged in a layer slightly higher than the dowel rods. For example, when a plurality of dowel rods are arranged to protrude from a side of a composite material, the one or more reinforcing bars can be aligned across the dowel rods and substantially perpendicular to the dowel rods (and substantially parallel to the corresponding wall of the composite material) in some embodiments. The reinforcing bars can provide support to the dowel rods when the dowel rods are used to position the composite material. In some embodiments, the reinforcing bars can be coupled (e.g., by metal wires) to the dowel rods to help retain their position.

In some embodiments where the composite material is in the form of a precast form, one or more anchors can be provided in the composite material. The anchors can assist with placement of the precast form in a desired location, for example. As an example, when a precast form is rectangular or square in shape, an anchor can be provided at each of the four corners in some embodiments.

Various embodiments of composite materials of the present invention can have different dimensions and shapes depending, for example, on the intended use, transportation requirements, and other factors. The dimensions and intended use, for example, can also impact the number and position of woven glass fiber fabrics within the composite material as discussed in more detail below.

Turning now to the woven fiber fabrics used in the composite materials, the fabrics can be woven from a variety of fibers (or strands of fibers) in various embodiments including, for example, glass, Kevlar, carbon, steel, polyester, and/or other fibers that might be woven in a fabric to improve the strength of the composite material without being incompatible with the inorganic ceramic matrix. If steel fibers or wires are used, the fibers or wires can be welded at the intersection points, rather than being woven.

Woven glass fiber fabrics are particularly suitable for use in some embodiments of composite materials of the present invention. With regard to woven glass fiber fabrics, a number of factors can be considered in selecting fiber glass strands for use in making the open weave fabrics for use in embodiments of the present invention including, for example, the desired weight per surface area of the fabric, tensile strength of the fabric, desired weave pattern, desired openness of the fabric, cost, and others. Similarly, one skilled in the art may choose one of many commercially available sizing compositions for the glass fibers based upon a number of factors including, for example, performance properties of the sizing compositions, desired flexibility of the resulting fabric, cost, and other factors. Additionally, in some embodiments, a particular weave pattern may be chosen based upon the desired amount of contact of the inorganic ceramic matrix between the gaps in the weave pattern. In some embodiments, the fabrics may have an open weave pattern such that the inorganic ceramic matrix may contact itself through the openings in the weave pattern. The glass fiber fabrics, in some embodiments, can be leno-grid woven glass fiber fabrics. In other embodiments, the glass fiber fabrics can be half leno-grid woven glass fiber fabrics.

As described herein, composite materials of the present invention can comprise various fiber glass fabrics including, for example, open weave fiber glass fabrics. Examples of open weave fiber glass fabrics can include, for example, leno-grid and half leno-grid woven glass fiber fabrics, and variations thereof. Such fabrics are commercially available from Textum Weaving, Inc. of Belmont, N.C. In selecting fabrics for use in composite materials of the present invention, relevant factors to be considered include the desired flexural strength of the fabric, the desired weight per surface area of the fabric, the desired modulus of the fabric, the desired void size (e.g., size of the holes or openings in the grid) of the fabric, and other factors. In some embodiments, for example, the desired void size (e.g., the length of one side of a void space in the grid) can generally be $1/8$ of an inch or greater. In some embodiments, the desired void size can be $3/16$ of an inch or greater. In some embodiments, the desired void size may be $1/4$ of an inch or greater. In some embodiments, the desired void size can be up to about an inch. Due to manufacturing variations, the void sizes in a particular open weave fabric may vary. An open weave fabric may have a nominal or desired void size, but the actual voids may fall within a range. For example, and without limitation, the majority of voids in a fabric having a nominal void size of $3/8$ of an inch may be between $1/8$ of an inch and $1/4$ of an inch in some embodiments.

The weight of the fabric can be selected based on a number of factors including, for example, the type of grid's design and construction (including, for example, leno-grids, half leno-grids, and other leno-grid derivatives), the desired strength of the fabric, whether the fabric will be coated with a polymer, and other. In some embodiments, the open weave glass fiber fabric may weigh about 8 oz/yd$^2$ or more. In some embodiments, the open weave glass fiber fabric may weigh about 13 oz/yd$^2$ or more. The open weave glass fiber fabric may weigh about 14 oz/yd$^2$ or more in some embodiments. In some embodiments, the open weave glass fiber fabric may be a leno-grid fabric weighing about 9 oz/yd$^2$ or more. The open weave glass fiber fabric may be a leno-grid fabric weighing about 9 oz/yd$^2$ in some embodiments. In some embodiments, the open weave glass fiber fabric may be a half leno-grid fabric weighing about 13 oz/yd$^2$ or more. The open weave glass fiber fabric may be a half leno-grid fabric weighing about 14 oz/yd$^2$ or more in some embodiments. A suitable weight range of open weave fiber glass fabrics for use in embodiments of the present invention may be between about 8 oz/yd$^2$ and about 25 oz/yd$^2$.

The properties of the fiber glass strands used to form the fabrics can be selected based on a number of factors as described herein. Prior to weaving, such fiberglass strands can be coated with most commercially available sizing compositions. As one example, such fabrics can be constructed using HYBON® 2022 direct draw roving commercially available from PPG Industries, Inc. In some embodiments, such fabrics may be constructed using HYBON® 2006 direct draw roving commercially available from PPG Industries, Inc. In some embodiments, the fiber glass strand used in the warp direction in forming the open weave fabric can have a yield of at least about 600 yards per pound, and the fiber glass strand used in the weft direction can have a yield of at least about 300 yards per pound. In one exemplary embodiment, the fiber glass strand used in the warp direction in forming the open weave fabric can have a nominal yield of about 675 yards per pound, and the fiber glass strand used in the weft direction can have a nominal yield of at least about 330 yards per pound. Additional information about such fabrics are provided throughout this application.

As noted elsewhere herein, in some embodiments, such open weave fabrics can be lightly coated with a polymer (e.g., polyacrylic) to provide more rigidity to the fabric. Such polymers can include thermoplastic or thermoset polymers. One example of such a polymer is an acrylic polymer. In some embodiments, when the open weave fabrics are at least partially coated with a polymer (e.g., polyacrylic), the polymer can increase the weight of the open weave fabric by about one ounce to two ounces per square yard. Additional information about the open weave fabrics are provided throughout this application.

In some embodiments, the inorganic ceramic matrix used in the composite material can comprise an inorganic ceramic material, and can also include randomly dispersed, irregularly sized pieces of stone (e.g., granite). Non-limiting examples of inorganic ceramic materials that can be used in some embodiments include magnesium-phosphate ceramic materials such as Grancrete PCW or Grancrete HFR (which are commercially available from Grancrete, Inc. of Morrisville, N.C.) and Ceramicrete (which is commercially available from Latitude 18, Inc. of Wilson, N.C.). Another example of an inorganic ceramic material that can be used in some embodiments of the present invention is Ballisticrete (which is commercially available from GigaCrete, Inc. of Las Vegas, Nev.). In some embodiments, the stone can comprise #57 granite, which is irregularly shaped having a size typically between about ¾ of an inch and one inch. The inorganic ceramic matrix, in some embodiments, can comprise from about 35% to about 50% of the ceramic material (e.g., Grancrete PCW or Grancrete HFR) and about 50% to about 65% stone (e.g., #57 granite) by weight. In some embodiments, the inorganic ceramic matrix can comprise ~40% of the ceramic material (e.g., Grancrete PCW) and ~60% stone (e.g., #57 granite) by weight.

Depending on the cure time of the inorganic ceramic matrix, in some embodiments, borax (i.e., disodium tetraborate) can be mixed with the inorganic ceramic matrix. In some embodiments where Grancrete PCW is used to form the inorganic ceramic matrix (with or without the pieces of stone), borax can be added to the Grancrete PCW to extend the cure time. For example, the cure time may need to be extended in some embodiments to position multiple fabrics within the inorganic ceramic matrix, to position dowel rods within the matrix, to position reinforcing bars within the matrix, and/or to position anchors within the matrix. In some embodiments, up to about 5% by weight borax can be added to the inorganic ceramic matrix based on the dry weight of the borax and the inorganic ceramic matrix (e.g., prior to the addition of water and curing). Between about 3 and 4% by weight borax can be added to the inorganic ceramic matrix based on the dry weight of the borax and the inorganic ceramic matrix (e.g., prior to the addition of water and curing) in some embodiments. In some embodiments, about 3.5% by weight borax can be added to the inorganic ceramic matrix based on the dry weight of the borax and the inorganic ceramic matrix (e.g., prior to the addition of water and curing).

Turning now to the Figures, FIG. 1 illustrates a cross-sectional view of a composite material according to one embodiment of the present invention. The sizes of the layers and the distances between the layers shown in FIG. 1 are for illustrative purposes. The composite material, in this embodiment, is precast and can be installed into a desired location such as a landing area for aircraft. In the embodiment shown in FIG. 1, the composite material 100 comprises an inorganic ceramic matrix 102 having a first surface 104 in facing opposition to a second surface 106 and a plurality of woven glass fabrics 108,110,112,114,116 disposed in the matrix 102 between the first surface 104 and the second surface 106, according to one embodiment of the present invention. As illustrated in FIG. 1, the composite material comprises a first woven glass fiber fabric 108 proximate to the first surface 106 of the inorganic ceramic matrix 102. In the embodiment shown, two additional woven glass fiber fabrics 110,112 are positioned approximately two inches above the first woven glass fiber fabric. Two additional woven glass fiber fabrics 114,116 are positioned approximately two inches above woven glass fiber fabric 112. Each of the woven fiber glass fabrics 108,110,112,114,116 are positioned in the lower half of the composite material 100 (i.e., closer to the second or bottom surface 106 than the first or top surface 104).

In some embodiments, the plurality of woven glass fiber fabrics 108,110,112,114,116 can comprise any woven glass fiber fabric not inconsistent with the objectives of the present invention. The plurality of woven glass fiber fabrics 108,110,112,114,116, in the embodiment shown, are open weave glass fiber fabrics. For example, in some embodiments, each woven glass fiber fabrics 108,110,112,114,116 can comprise an approximately 14.5 ounce/square yard E-glass half leno-grid fabric. In some embodiments, the glass fiber fabrics 108,110,112,114,116 can be lightly coated with a polymer such as an acrylic polymer. The polymer, for example, can assist in holding the fabrics 108,110,112,114,116 together, making the fabrics 108,110,112,114,116 more rigid, and/or facilitating construction of a composite material. The polymer can, in some embodiments, increase the weight of the fabric by approximately one ounce per yard.

Figure 2:
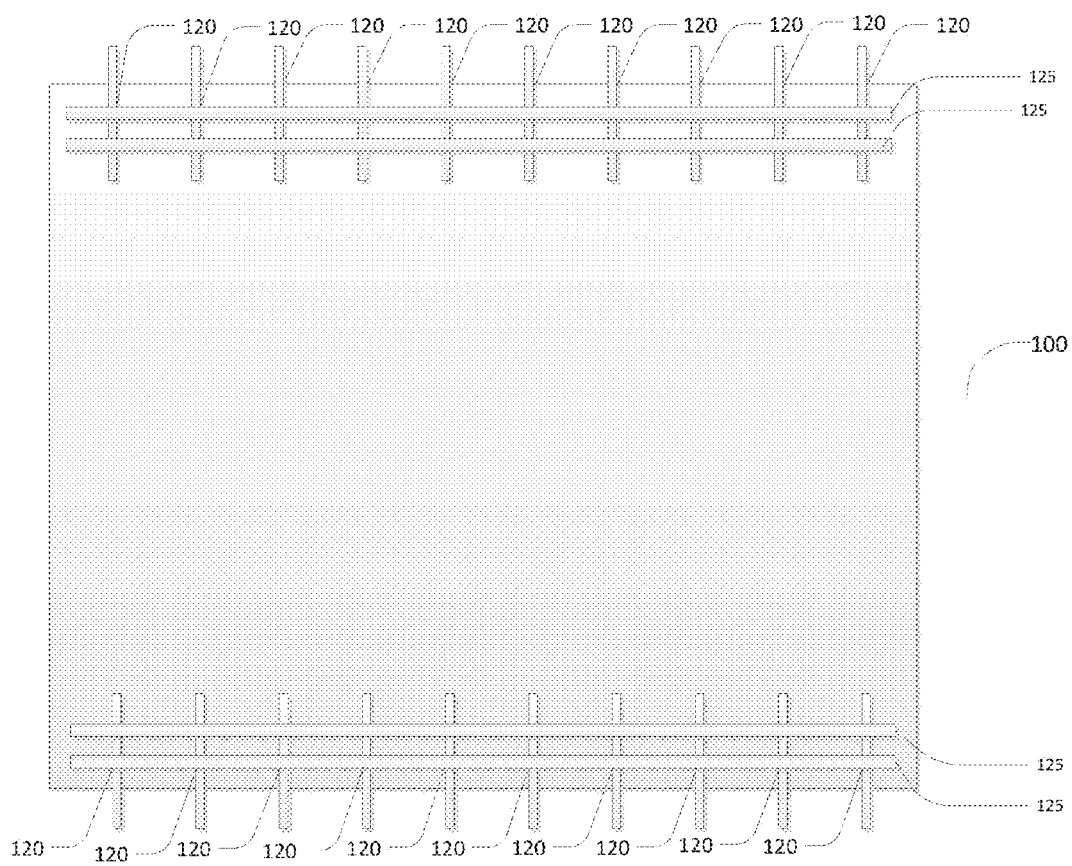
FIG. 2 is a schematic illustrating an arrangement of dowel rods and reinforcing bars in a composite material according to one embodiment of the present invention. The sizes of the layers, the sizes of the components, and the distances between the layers shown in FIG. 2 are for illustrative purposes.
Figure 3:
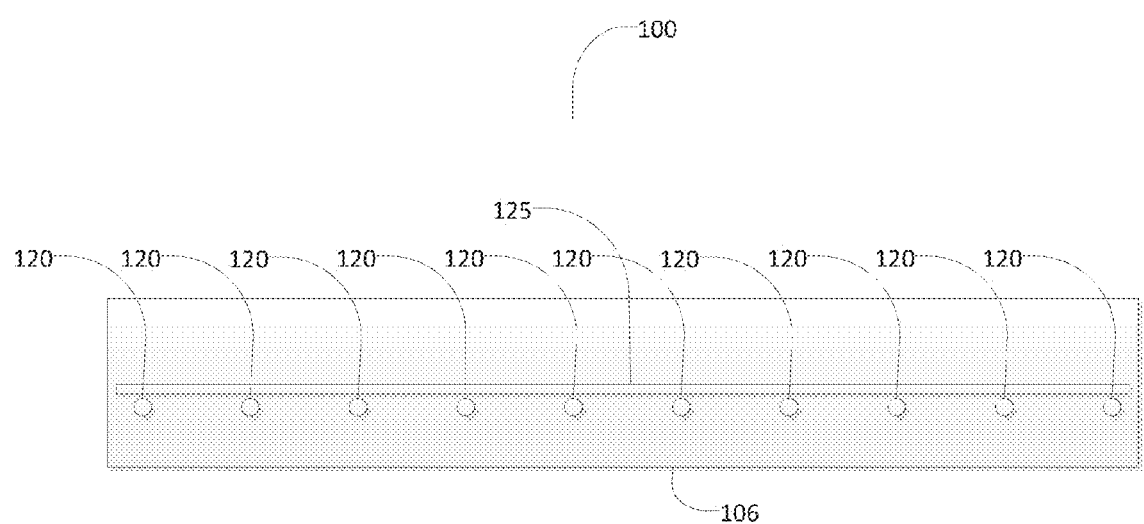
FIG. 3 is a side view of the schematic in FIG. 2 illustrating the side identified by A-A in FIG. 2. The sizes of the layers, the sizes of the components, and the distances between the layers shown in FIG. 3 are for illustrative purposes.
Figure 4:
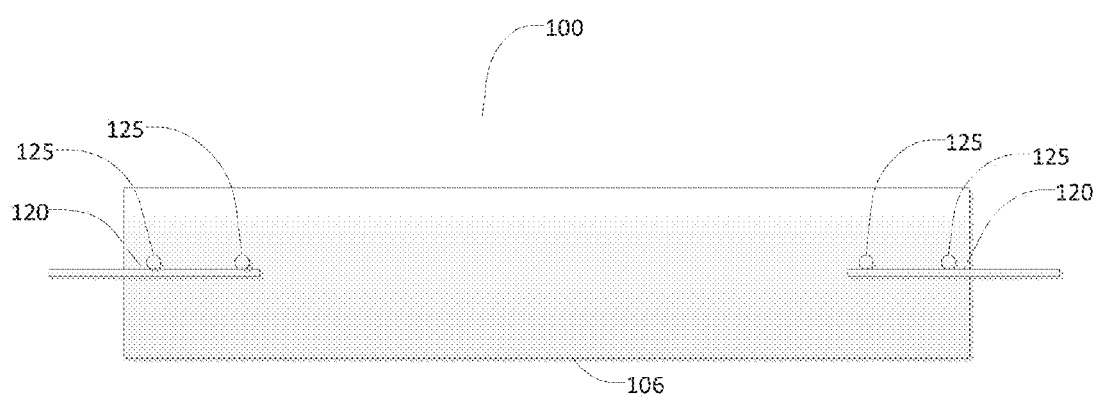
FIG. 4 is a side view of the schematic in FIG. 2 illustrating the side identified by B-B in FIG. 2. The sizes of the layers, the sizes of the components, and the distances between the layers shown in FIG. 4 are for illustrative purposes.

FIGS. 2-4 are schematics illustrating an arrangement of dowel rods 120 and reinforcing bars 125 in a composite panel 100 according to one embodiment of the present invention. The composite material 100 comprises a plurality of dowel rods 120 in the embodiment shown. The dowel rods 120 can, for example, assist with placement of the precast composite material. The dowel rods 120 are positioned within the composite material so as to assist with placement of the precast form shown in this embodiment in a desired location. As shown in FIG. 2, in this embodiment, a plurality of dowel rods 120 are positioned down opposing sides of the composite material 100. In this embodiment, the dowel rods 120 are positioned approximately one foot apart from each other. The dowel rods 120 are arranged substantially perpendicular to the side from which they protrude in this embodiment. The dowel rods 120 can extend through corresponding holes in the casting form to help position them in the composite material. The dowel rods can be solid, smooth rods in some embodiments, while in other embodiments, the rods can be textured. The dowel rods can be made from a variety of materials and be a variety of sizes depending on the size and weight of the composite material, the thickness of the composite material, the number of dowel rods to be used, the positions of the dowel rods, and other factors. In some exemplary embodiments, the dowel rods can be generally cylindrical steel bars having a length of about two feet and a diameter between about one inch and 1.25 inches In the embodiment shown, two reinforcing bars 125 are positioned above each set of dowel rods 120. In other words, two reinforcing bars 125 are positioned above the set of dowel rods 120 extending out of one side of the composite material 100 and two additional reinforcing bars 125 are positioned above the set of dowel rods 120 extending out of the other side of the composite material 100. The reinforcing bars 125 are arranged substantially perpendicular to the dowel rods 120 above which they are positioned. The reinforcing bars 125 can be connected to the dowel rods 120 (e.g., using metal wires) to help hold the dowel rods 120 in position (e.g., in combination with holes in a casting form corresponding to the dowel rods 120). The reinforcing bars 125 can provide support to the dowel rods 120 when the dowel rods are used to transport and install the composite material. In some embodiments, the reinforcing bars 125 can be #5 size reinforcing bars which have a nominal diameter of ⅝ of an inch and a nominal weight per unit length of 1.043 pounds per foot. Reinforcing bars of other sizes can be selected and used depending on a number of factors including, for example, the dimensions of the composite material, the number and position of dowel rods 120 in the composite material, the desired number of reinforcing bars 125, cost, and other factors.

To prepare a composite material such as one similar to the embodiment shown in FIGS. 1-4, a casting form is first assembled. For the embodiment shown, the casting form would include four metal sidewalls connected to form the basic shape (generally square in the embodiment shown) of the composite material 100. The height of the sidewalls may be larger than the desired thickness of the composite material 100 in some embodiments, while in other embodiments, the height of the sidewalls may match the desired thickness of the composite material 100. In other words, in some embodiments, the inorganic ceramic matrix may be poured to be level with the height of the sidewalls so as to provide a generally smooth top surface 104 of the composite material 100. A piece of plastic or similar material may be provided on the bottom of the casting form to assist in forming and in transportation of the composite material 100 (in embodiments where the composite material is to be transported to the installation location). In some embodiments, a metal wax can also be wiped on the sides of the casting form to assist with release of a composite material from a casting form.

Dowel rods 120 are positioned in two of the sidewalls of the casting form. Holes can be provided in the sidewalls of the casting form at the appropriate locations for positioning the corresponding dowel rods 120. Approximately one-half of the length of the dowel rods 120 extends into the casting form and the other half extends out of the casting form in the embodiment shown. Two reinforcing bars 125 are laid on top of the dowel rods 120 on one side of the casting form, and two additional reinforcing bars 125 are laid on top of the dowel rods 120 on the opposite side of the casting form. The reinforcing bars 125 are connected to the dowel rods 120 using metal wires to help hold the dowel rods 120 in position (in combination with holes in a casting form corresponding to the dowel rods 120).

After the casting form is prepared, the open weave glass fiber fabric 108 is positioned in the casting form. Following this, the inorganic ceramic matrix 102 is prepared. For example, a dry mixture comprising ~40% by weight Grancrete PCW and ~60% by weight #57 granite can be prepared, and then ~3.5% by weight borax can be added to the inorganic ceramic matrix based on the dry weight of the borax and the dry mixture. Approximately 20% by weight water can then added to the dry mixture and mixed in some embodiments. Once water is added and the inorganic ceramic matrix is mixed, approximately two inches of the inorganic ceramic matrix can be poured into the casting form on top of the open weave glass fiber fabric 108. The inorganic ceramic matrix 102 can then be leveled using techniques known to those of skill in the art. The two additional open weave glass fiber fabrics 110,112 can then be placed on the inorganic ceramic matrix 102. Following placement of the two open weave glass fiber fabrics 110,112, two more inches of the inorganic ceramic matrix 102 can be poured into the casting form. After leveling, the two additional open weave glass fiber fabrics 114,116 can be placed on the inorganic ceramic matrix 102. As shown in FIG. 1, these two additional fabrics 114,116 are below the dowel rods 120 in the casting form in this embodiments. Finally, seven more inches of the inorganic ceramic matrix 102 are poured into the casting form and leveled. The top surface of the inorganic ceramic matrix can be leveled using techniques known to those of skill in the art. For example, in various embodiments, items such as a concrete vibrator or a screed can be used to level the inorganic ceramic matrix 102 and to remove air from the inorganic ceramic matrix 102. The above steps are performed in a period of time that is less than the cure time of the inorganic ceramic matrix 102. The inorganic ceramic matrix 102 is then permitted to cure.

Figure 5:
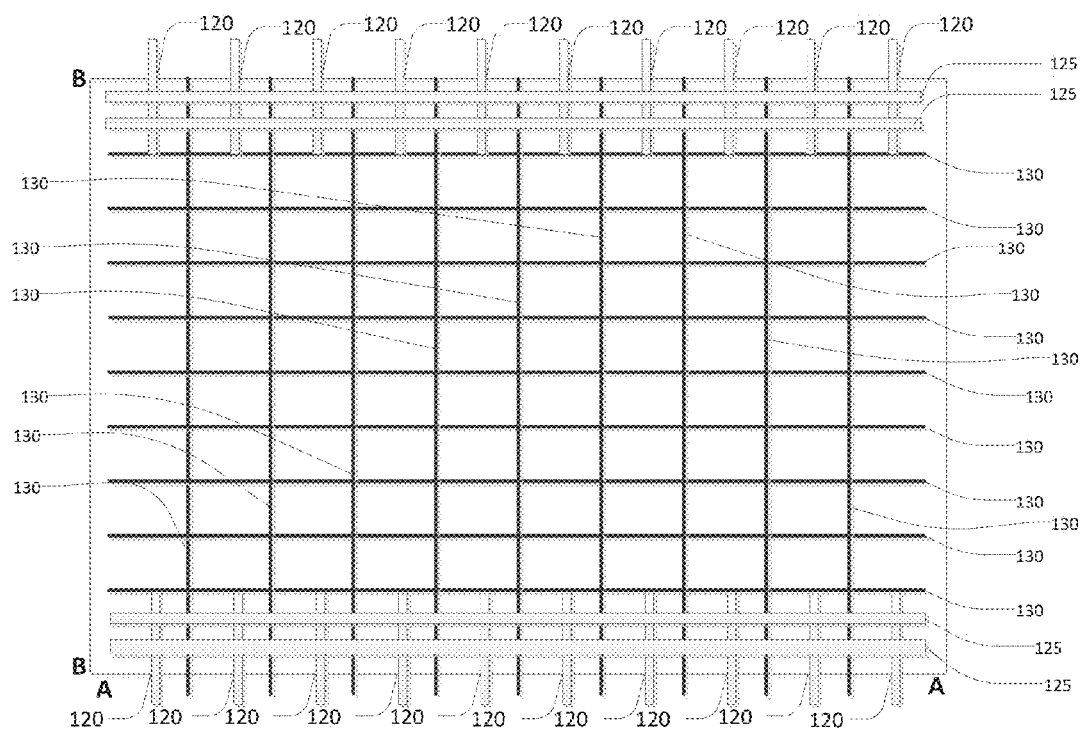
FIG. 5 is a schematic illustrating an arrangement of dowel rods and reinforcing bars in a composite material according to another embodiment of the present invention. The sizes of the layers, the sizes of the components, and the distances between the layers shown in FIG. 5 are for illustrative purposes.
Figure 6:
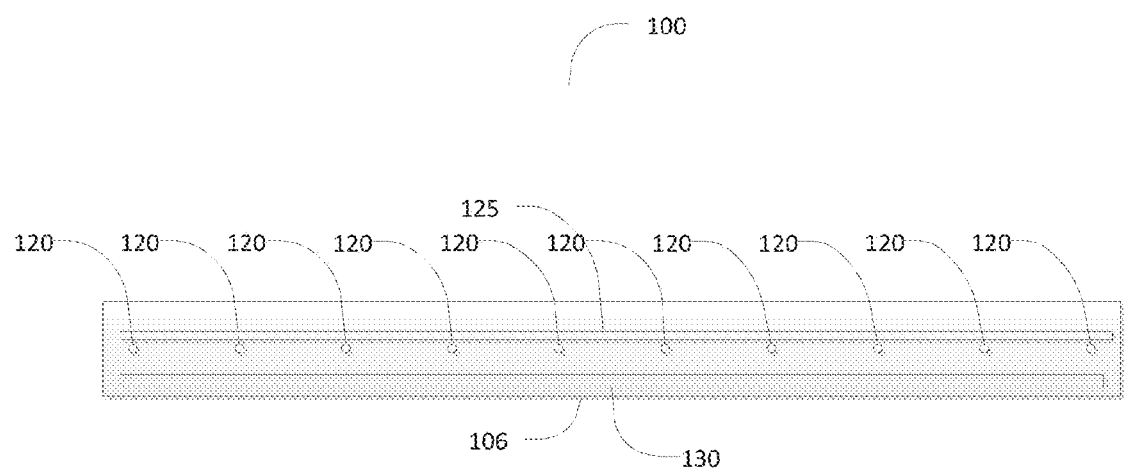
FIG. 6 is a side view of the schematic in FIG. 5 illustrating the side identified by A-A in FIG. 5. The sizes of the layers, the sizes of the components, and the distances between the layers shown in FIG. 6 are for illustrative purposes.
Figure 7:
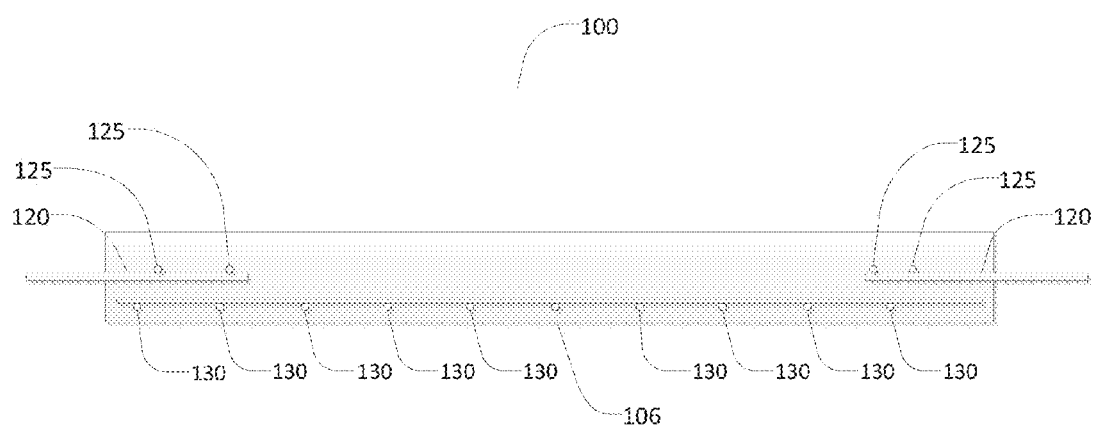
FIG. 7 is a side view of the schematic in FIG. 5 illustrating the side identified by B-B in FIG. 5. The sizes of the layers, the sizes of the components, and the distances between the layers shown in FIG. 7 are for illustrative purposes.

Reinforcing bars can optionally be provided in a grid pattern near the bottom of the composite material in some embodiments. Such a grid of reinforcing bars can, for example, provide additional stiffness in reinforcing the inorganic ceramic matrix some applications. An example of such an arrangement is illustrated in FIGS. 5-7 which show reinforcing bars 130 provided in a grid pattern near the bottom surface 106 of the composite material 100. The grid of reinforcing bars 130 is arranged approximately 1.5 inches from the bottom of the casting form in the embodiment shown. The grid of reinforcing bars 130 can be positioned in the casting form prior to positioning of the open weave glass fiber fabric 108 and prior to pouring of the inorganic ceramic matrix 102. In some embodiments, the reinforcing bars 130 can be #3 size reinforcing bars which have a nominal diameter of ⅜ of an inch and a nominal weight per unit length of 0.376 pounds per foot. Reinforcing bars 130 of other sizes can be selected and used depending on a number of factors including, for example, the dimensions of the composite material, the desired number of reinforcing bars 130, the desired distance between each reinforcing bar 130, cost, and other factors.

Figure 8:
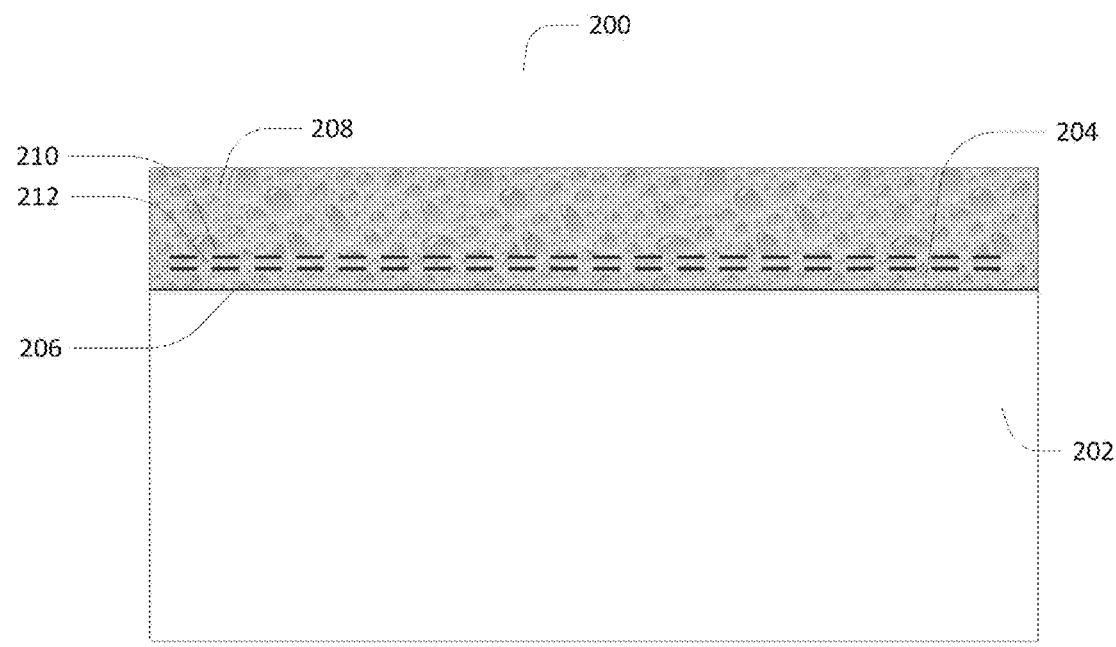
FIG. 8 illustrates a cross-sectional view of a composite material according to one embodiment of the present invention. The sizes of the layers, the sizes of the components, and the distances between the layers shown in FIG. 8 are for illustrative purposes.

FIG. 8 is a cross-sectional view illustrating another embodiment of a composite material 200 of the present invention. In this embodiment, the composite material 200 may be combined with a layer of concrete 202 to provide a landing pad, roadway, or similar surface. The composite material 200 is poured and bonded to the concrete 202 in this embodiment. A layer of concrete 202 may exist or may be poured at a particular location. For example, the concrete may be about 12-18 inches thick depending, for example, of the geology of the ground in which the concrete was poured. The embodiment illustrated in FIG. 8 could be used with other concrete thicknesses as well.

If the concrete layer is new, an existing casting form may be in place for formation of the composite material. Such a casting form may include walls to allow room for formation of the composite material on top of the concrete. If the concrete layer was constructed some time ago, then a casting form may need to be constructed for formation of the composite material. Such a situation might arise if the composite material is being used to repair or replace another material on the concrete (or the concrete itself).

As shown in FIG. 8, the composite material 200 is formed on top of a concrete layer 202. Specifically, the composite material 200 is formed such that its bottom surface 204 is directly bonded to the top surface 206 of the concrete layer 202. Prior to pouring the inorganic ceramic matrix of the composite material 200, the top surface 206 of the concrete layer 202 can first be treated to, for example, clean the surface and/or improve adhesion to the inorganic ceramic matrix. For example, the roughness of the surface of the concrete layer 202 can be increased prior to casting the composite material in the form in order to improve adhesion between the composite material and the concrete. The surface of the concrete can be etched with phosphoric acid by pouring mild phosphoric acid (pH of about 2) on the top surface and allowing it to sit for about 5 minutes. Other acids such as, for example, hydrochloric acid and others, could also be used. The top surface can then be rinsed off with water to remove any residue. Rather than etching with an acid, the top surface could also be roughened by sandblasting, for example, in some embodiments.

A casting form for the composite material 200 can be constructed on top of the concrete layer 202. The casting form could be, for example, primarily just a series of sidewalls having the desired dimensions of the composite material 200. In some embodiments, the desired dimensions of the composite material can match the dimensions of the concrete, while in other embodiments, multiple units of composite materials can be formed on a single layer of concrete.

In the embodiment shown, the concrete layer 202 is approximately 18 inches thick, and the composite material 200 is approximately 6 inches thick. The composite material comprises an inorganic ceramic matrix 208 and two open weave glass fiber fabrics 210,212, although other woven fiber fabrics disclosed herein could also be used. As an example, each of the open weave glass fiber fabrics 210,212 could be half leno-grid glass fiber fabrics having a nominal weight of about 14.5 ounces per square yard, and could be coated with ~10% by weight of a polyacrylic coating which adds about another ounce per square yard to the weight of the fabrics 210,212. Such fabrics could constructed using HYBON® 2022 direct draw roving commercially available from PPG Industries, Inc. The fiber glass strand used in the warp direction to form the fabrics 210,212 could have, for example, a nominal yield of about 675 yards per pound, and the fiber glass strand used in the weft direction could have a nominal yield of about 330 yards per pound.

The lower fabric 212 is positioned approximately 0.5 inches from the bottom surface 204, and the upper fabric 210 is adjacent to the lower fabric 212. To form the composite material 200, about two inches of the inorganic ceramic matrix 208 is poured into the casting form. The inorganic ceramic matrix 208 is then leveled using techniques known to those of skill in the art. The open weave glass fiber fabrics 210,212 are then placed on the inorganic ceramic matrix 208. Following placement of the two open weave glass fiber fabrics 210,212, about 1.5 more inches of the inorganic ceramic matrix 208 is poured into the casting form and leveled. A conventional screed or vibrating screed can be used to level the inorganic ceramic matrix 208 and to remove air from the inorganic ceramic matrix 208. The above steps should be performed in a period of time that is less than the cure time of the inorganic ceramic matrix 208.

The top surface of the inorganic ceramic matrix 208 can optionally be roughened by spreading sand thinly on the surface. After hardening of the inorganic ceramic matrix 208, the excess sand can then be swept off, while some of the sand will remain embedded in the surface of the inorganic ceramic matrix 208. The inorganic ceramic matrix 208 is then permitted to cure.

The inorganic ceramic matrix 208 used in this embodiment can be formed, for example, from a dry mixture comprising ~40% by weight Grancrete PCW and ~60% by weight #57 granite. About 3.5% by weight borax can be added to the inorganic ceramic matrix based on the dry weight of the borax and the dry mixture. Approximately 20-24% by weight water can be added, and the inorganic ceramic matrix can be mixed prior to pouring into the casting form.

Some embodiments of the present invention will now be illustrated in the following specific, non-limiting examples.

EXAMPLE 1

One example of an embodiment of a composite material according to the present invention is as follows. The composite material had a structure similar to that shown in FIGS. 1-4. For ease of illustration, the labels used in FIGS. 1-4 will be used to characterize the components of the composite material in this Example, but this Example should not be viewed as limiting other embodiments of the present invention that might also have a structure similar to that shown in FIGS. 1-4. This embodiment of a composite material 100 was approximately 11 inches thick and approximately 10 feet long and 10 feet wide.

The dowel rods 120 were positioned in the inorganic ceramic matrix 102 approximately six inches from the bottom surface 106. Each dowel rod 120 was approximately two feet long, with approximately one foot of the dowel rod 120 extending into the composite material 100 and approximately one foot of the dowel rod 120 extending out of the composite material 100. The plurality of dowel rods 120 were positioned down opposing sides of the composite material 100. The dowel rods 120 extended through corresponding holes in a casting form. The dowel rods 120 were positioned approximately one foot apart from each other. The dowel rods 120 were arranged substantially perpendicular to the side from which they protrude. The dowel rods 120 were cylindrical steel bars having a diameter between about one inch and 1.25 inches. Two reinforcing bars 125 were positioned above each set of dowel rods 120. The reinforcing bars 125 were arranged substantially perpendicular to the dowel rods 120 above which they were positioned. The reinforcing bars 125 in this example were #5 size reinforcing bars. The reinforcing bars 125 were secured to the dowel rods 120 using metal wires.

Each of the open weave glass fiber fabrics 108,110,112, 114,116 were half leno-grid glass fiber fabrics having a nominal weight of about 14.5 ounces per square yard. The fabrics 108,110,112,114,116 were coated with ~10% by weight of a polyacrylic coating which added about another ounce per square yard to the weight of the fabrics 108,110, 112,114,116. The fabrics were constructed using HYBON® 2022 direct draw roving commercially available from PPG Industries, Inc. The fiber glass strand used in the warp direction to form the fabrics 108,110,112,114,116 had a nominal yield of about 675 yards per pound, and the fiber glass strand used in the weft direction had a nominal yield of about 330 yards per pound.

The lower fabric 108 was positioned proximate the bottom surface 106. Fabrics 110,112 were positioned about two inches above the lower fabric 108. Fabrics 114,116 were positioned about two inches above the middle fabrics 110, 112, such that the uppermost fabric 116 was about seven inches from the top surface 102.

The inorganic ceramic matrix 102 was formed from a dry mixture comprising ~40% by weight Grancrete PCW and ~60% by weight #57 granite. About 3.5% by weight borax was added to the inorganic ceramic matrix based on the dry weight of the borax and the dry mixture. Approximately 20-24% by weight water was added, and the inorganic ceramic matrix was mixed prior to pouring into the casting form.

The composite material was prepared as described in connection with FIGS. 1-4. In addition, after the inorganic ceramic matrix was poured, but prior to curing, the matrix was leveled using a conventional screed. Further, the top surface of the inorganic ceramic matrix was roughened by spreading sand thinly on the surface. After hardening of the inorganic ceramic matrix, the excess sand was swept off, while some of the sand remained embedded in the surface of the inorganic ceramic matrix.

EXAMPLE 2

In this example, an embodiment of a composite material of the present invention is described in the form of a tile. FIG. 9 is a cross-sectional view illustrating the composite material 300 described in this example. The composite material 300 comprised a layer of concrete 302, an inorganic ceramic matrix 304 in contact with the concrete 300, and two open weave glass fiber fabrics 306,308 within the inorganic ceramic matrix 304. In a tile form, a plurality of composite materials can be formed and then assembled into a landing pad at a desired location. The size and shape of the tiles can depend on a number of factors including, for example, the size and weight of the vehicles or aircraft that will use the landing pad, the distance between the manufacturing location and the installation location, the mode of transportation to deliver the tiles, the desired properties of the tiles, and/or other factors. In this Example, the composite material 300 was generally circular having a diameter of about 24 inches and a thickness of about six inches.

A casting form was constructed that corresponded with the size and shape of the composite material to be formed (i.e., generally circular and having an interior diameter of about 24 inches). Conventional premixed, 5000 psi concrete was prepared using techniques known to those of skill in the art and then poured into the casting form to a nominal depth of 3 inches. The concrete was allowed to cure for about 28 days. The top surface 310 of the concrete 302 was then etched with phosphoric acid using techniques to known to those of skill in the art.

The inorganic ceramic matrix 304 was then prepared. The inorganic ceramic matrix 304 was formed from a dry mixture comprising ~40% by weight Grancrete PCW and ~60% by weight #57 granite. About 3.5% by weight borax was added to the inorganic ceramic matrix based on the dry weight of the borax and the dry mixture. Approximately 20-24% water by weight was then added, and the inorganic ceramic matrix was then mixed.

A thin layer of the inorganic ceramic matrix 304 (~⅛ to ¼ of an inch thick) was then poured onto the top surface 310 of the concrete 302 such that the bottom surface 312 of the inorganic ceramic matrix was in contact with the top surface 310 of the concrete 302. The two open weave glass fiber fabrics 306,308 were then placed on top of the thin layer of the inorganic ceramic matrix 304. Each of the open weave glass fiber fabrics 306,308 were half leno-grid glass fiber fabrics having a nominal weight of about 14.5 ounces per square yard. The fabrics 306,308 were coated with ~10% by weight of a polyacrylic coating which added about another ounce per square yard to the weight of the fabrics 306,308. The fabrics were constructed using HYBON® 2022 direct draw roving commercially available from PPG Industries, Inc. The fiber glass strand used in the warp direction to form the fabrics 306,308 had a nominal yield of about 675 yards per pound, and the fiber glass strand used in the weft direction has a nominal yield of about 330 yards per pound. Following placement of the two open weave glass fiber fabrics 306,308, additional inorganic ceramic matrix 304 was poured into the casting form and leveled so that the inorganic ceramic matrix was approximately 3 inches thick. The tile then had a total thickness of about 6 inches (approximately 3 inches from the concrete 302 layer and approximately 3 inches from the inorganic ceramic matrix/glass fabrics layer). A conventional screed was then used to level the inorganic ceramic matrix 304 and to remove air from the inorganic ceramic matrix 304. The above steps were performed in a period of time that is less than the cure time of the inorganic ceramic matrix 304. The inorganic ceramic matrix 304 was then permitted to cure.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

What is claimed is:

1. A composite material comprising:
   an inorganic ceramic matrix having a top surface in facing opposition to a bottom surface and at least one side surface between the top surface and the bottom surface;
   a first open weave fabric comprising a plurality of fibers disposed in the matrix proximate the bottom surface of the matrix;
   a first region of the matrix located between the first open weave fabric and the top surface of the matrix;
   at least one additional open weave fabric comprising a plurality of fibers disposed in the first region and positioned closer to the bottom surface than the top surface of the matrix; and
   a plurality of reinforcing bars arranged in a grid pattern disposed in the matrix between the first open weave fabric and the bottom surface and proximate the bottom surface of the matrix.

2. The composite material of claim 1, wherein the at least one additional open weave fabric comprises two open weave fabrics adjacent to one another in the first region of the matrix.

3. The composite material of claim 2, further comprising a second region above the first region and below the top surface, wherein the second region and comprises at least two open weave fabrics adjacent to one another and positioned closer to the bottom surface of the matrix than to the top surface.

4. The composite material of claim 1, further comprising a plurality of dowel rods extending from at least one side surface of the inorganic ceramic matrix.

5. The composite material of claim 1, wherein the inorganic ceramic matrix comprises a phosphate ceramic matrix.

6. The composite material of claim 5, wherein the inorganic ceramic matrix further comprises a plurality of stones.

7. The composite material of claim 6, wherein the plurality of stones comprise from about 50% to about 65% by weight of the inorganic ceramic matrix.

8. The composite material of claim 1, wherein the at least one open weave fabric comprises an open weave fiber glass fabric.

9. The composite material of claim 8, wherein the at least one open weave fiber glass fabric weighs less than about 25 ounces per square yard.

10. The composite material of claim 8, wherein the at least one open weave fiber glass fabric is at least partially coated with a polymer.

11. A panel comprising the composite material of claim 1.

12. A landing pad comprising the composite material of claim 1.

13. A composite material comprising:
- an inorganic ceramic matrix having a top surface in facing opposition to a bottom surface;
- at least one open weave fabric comprising a plurality of fibers disposed in the matrix between the top surface and the bottom surface; and
- a concrete layer wherein a surface of the concrete layer is in direct contact with the bottom surface of the inorganic ceramic matrix, wherein a majority of the open weave fabrics are positioned closer to the bottom surface than the top surface of the matrix.

14. The composite material of claim 13, wherein the at least one open weave fabric comprises a first open weave fabric disposed in the matrix proximate the bottom surface of the matrix.

15. The composite material of claim 13, wherein the at least one open weave fabric comprises two open weave fabrics disposed in the matrix adjacent to each other and proximate the bottom surface of the matrix.

16. The composite material of claim 13, wherein the inorganic ceramic matrix comprises a phosphate ceramic matrix.

17. The composite material of claim 16, wherein the inorganic ceramic matrix further comprises a plurality of stones.

18. The composite material of claim 17, wherein the plurality of stones comprise from about 50% to about 65% by weight of the inorganic ceramic matrix.

19. The composite material of claim 13, wherein the at least one open weave fabric comprises an open weave fiber glass fabric.

20. The composite material of claim 19, wherein the at least one open weave fiber glass fabric weighs less than about 25 ounces per square yard.

21. The composite material of claim 19, wherein the at least one open weave fiber glass fabric is at least partially coated with a polymer.

22. A panel comprising the composite material of claim 13.

23. A landing pad comprising the composite material of claim 13.

24. A composite material comprising:
- an inorganic ceramic matrix having a top surface in facing opposition to a bottom surface and at least one side surface between the top surface and the bottom surface;
- a first open weave pattern material comprising a plurality of intersecting wires disposed in the matrix proximate the bottom surface of the matrix;
- a first region of the matrix located between the first open weave pattern material and the top surface of the matrix; and
- at least one open weave fabric comprising a plurality of fibers disposed in the first region and positioned closer to the bottom surface than the top surface of the matrix, wherein a majority of the open weave fabrics are positioned closer to the bottom surface than the top surface of the matrix.

25. A landing pad comprising the composite material of claim 24.

26. A composite material comprising:
- an inorganic ceramic matrix having a top surface in facing opposition to a bottom surface and at least one side surface between the top surface and the bottom surface;
- a first open weave fabric comprising a plurality of fibers disposed in the matrix proximate the bottom surface of the matrix;
- a first region of the matrix located between the first open weave fabric and the top surface of the matrix;
- at least one additional open weave fabric comprising a plurality of fibers disposed in the first region and positioned closer to the bottom surface than the top surface of the matrix;
- a plurality of reinforcing bars arranged in a grid pattern disposed in the matrix between the first open weave fabric and the bottom surface and proximate the bottom surface of the matrix;
- a concrete layer wherein a surface of the concrete layer is in direct contact with the bottom surface of the inorganic ceramic matrix;
- a plurality of stones comprising from about 50% to about 65% by weight of the inorganic ceramic matrix; and
- a plurality of dowel rods extending from at least one side surface of the inorganic ceramic matrix;
- wherein the plurality of dowel rods are positioned at least four inches from the bottom surface of the matrix.

* * * * *